(No Model.)
C. B. COXE.
MANUFACTURE OF BRICKS.
No. 521,535. Patented June 19, 1894.
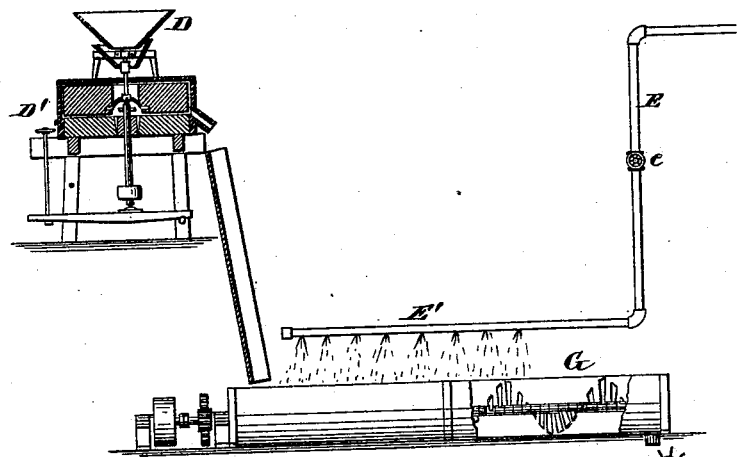
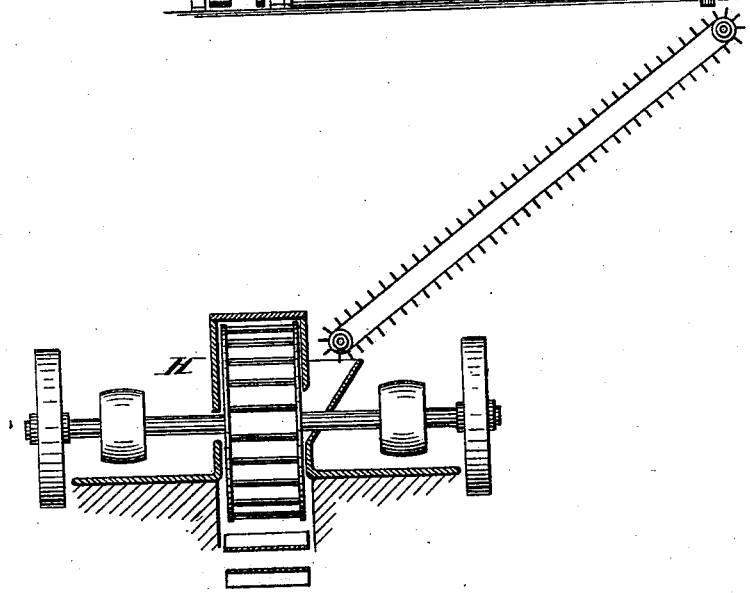
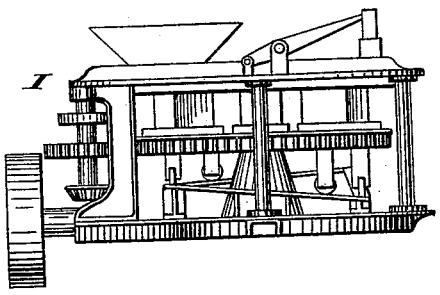
Witnesses:
Charles R. Searle.
Jose L. Fingleton.
Inventor:
Charles B. Coxe
by his attorney
Thomas Drew Stetson

UNITED STATES PATENT OFFICE.

CHARLES B. COXE, OF BROOKLYN, NEW YORK, ASSIGNOR TO EDWARD B. ESTERBROOK, OF SAME PLACE.

MANUFACTURE OF BRICKS.

SPECIFICATION forming part of Letters Patent No. 521,535, dated June 19, 1894.

Application filed March 17, 1892. Serial No. 425,228. (No specimens.)

*To all whom it may concern:*

Be it known that I, CHARLES B. COXE, a citizen of the United States, residing in Brooklyn, county of Kings, and State of New York, have invented a certain new and useful Improvement in the Manufacture of Bricks, of which the following is a specification.

It has long been common to grind or otherwise disintegrate slate-rock to produce the material for brick manufacture. Such particles of slate are compressed together to cohere and form a moderately strong "biscuit," which biscuit or unburned brick being subsequently burned in a kiln will produce a brick superior in important points to corresponding bricks made from natural clay. It is possible to apply sufficient pressure to form such biscuit in the dry condition in which it would come from the grinding apparatus; but the operation is greatly facilitated by adding a small quantity of water and causing it to be uniformly diffused. I have discovered that the temperature of the disintegrated slate at the time of the compression has an important influence, and that by working the material with a little less than the ordinary quantity of moisture, and with the whole mass and the mold at a temperature of about 150° Fahrenheit, the pressure being as heretofore, the material will flow into the corners more sharply, and the bricks will be of more uniform texture, and on burning will produce stronger and better bricks with diminished chances of blistering, cracking or other fault.

The slate may be the waste from the manufacture of slate articles. I break it fine, and treat it by grinding so as to both disintegrate and raise the temperature. I preferably grind it by burr mill-stones. A small quantity of boiling water should be applied as fast as the ground slate comes from the mill, and being kneaded forms lumps which are again broken by passing through concentric series of revolving bars, and may then be immediately supplied to the machine and molded into bricks. These bricks are preferably placed on suitable carriers, and pass through artificial driers, preferably such as described in the patent to S. G. Phillips, dated March 31, 1891, No. 449,170, so as to be presented first to warm damp air, and afterward successively to drier and cooler air until the bricks emerge sufficiently cooled to be conveniently handled, and dry enough to be placed immediately in the kiln and burned.

The accompanying drawing forms a part of this specification and represents what I consider the best means of carrying out the invention. It is an elevation partly in section, showing the apparatus for preparing the material, and the machine for compressing it into bricks.

D is the hopper receiving the material and storing it, and having an ordinary shaking shoe or other suitable device for supplying the broken material in a heated condition to a burr-mill D', as shown.

E' is a sprinkler supplied by a pipe E, bringing hot water from a steam-boiler, or other source, not shown. A stop-cock $e$ in the pipe E regulates the supply of water. This device supplies the water in a finely divided condition, and in regulated quantities to mingle with the heated slate.

G is a kneading machine or mixer, and H is a disintegrator for the balls in which the fine material is usually delivered from the kneading machine.

The material may, before or after its introduction to the hopper, be subjected to a preliminary heating by any ordinary means, as a furnace, a floor under-laid with flues or steam pipes, or a jet of hot steam thrown on the material direct.

I is the machine in which the heated and dampened material is supplied in regulated quantities to molds and compressed and delivered completely shaped and ready for drying and burning.

The drying may be omitted, and the bricks or analogous articles shaped by pressure under these conditions can be piled immediately in the open-work condition in which they are usually placed in the kiln, and the slight quantity of moisture contained will be driven off during the period of moderate firing with which the burning in the kiln is commenced. The warmth and the dryness with which my bricks are piled in the kiln insures that there is but little moisture remaining to be thus driven off when the firing commences.

Modifications may be made without departing from the principle or sacrificing the advantages of the invention.

I can use other grinding means than burr-stones, but it conduces greatly to economy to use the grinding means which shall raise the temperature of the material, and to use the pulverized material immediately after by treating it with the hot water and kneading it so as to utilize the heat induced by the grinding.

What I designate as slate, may be shale, or rock clay.

I can make any size or style of brick.

I can make tiles or analogous articles by whatever name they may be called.

I claim as my invention—

In the manufacture of bricks, the method described of treating slate, consisting of first heating to a temperature of from 150° to 200° Fahrenheit, grinding, slightly dampening, molding and compressing all in the heated condition and subsequently drying and burning, all substantially as herein specified.

In testimony that I claim the invention above set forth I affix my signature in presence of two witnesses.

CHARLES B. COXE.

Witnesses:
H. A. JOHNSTONE,
J. L. FINGLETON.